(12) United States Patent
Tsai et al.

(10) Patent No.: US 10,305,308 B2
(45) Date of Patent: May 28, 2019

(54) POWER SUPPLY MODULE AND POWER SUPPLY METHOD USING THE SAME

(71) Applicant: ASUSTeK COMPUTER INC., Taipei (TW)

(72) Inventors: Ming-Ting Tsai, Taipei (TW); Wei-Chen Tu, Taipei (TW); Hsiang-Jue Hung, Taipei (TW)

(73) Assignee: ASUSTeK COMPUTER INC., Taipei (TW)

( * ) Notice: Subject to any disclaimer, the term of this patent is extended or adjusted under 35 U.S.C. 154(b) by 226 days.

(21) Appl. No.: 15/176,173

(22) Filed: Jun. 8, 2016

(65) Prior Publication Data

US 2017/0025878 A1 Jan. 26, 2017

(30) Foreign Application Priority Data

Jul. 20, 2015 (TW) .............................. 104123418 A (51) Int. Cl.
*H02J 7/00* (2006.01)
*H02J 7/14* (2006.01)

(52) U.S. Cl.
CPC ............ *H02J 7/0068* (2013.01); *H02J 7/007* (2013.01); *H02J 7/0014* (2013.01); *H02J 7/0052* (2013.01); *H02J 7/0054* (2013.01)

(58) Field of Classification Search
USPC ....... 320/134, 103, 107, 116, 145, 162, 117, 320/126, 128
See application file for complete search history.

(56) References Cited

U.S. PATENT DOCUMENTS

| | | | | |
|---|---|---|---|---|
| 6,498,461 | B1* | 12/2002 | Bucur | H02J 7/0018 320/145 |
| 2005/0242772 | A1* | 11/2005 | Cha | H02J 7/0068 320/115 |
| 2005/0253560 | A1* | 11/2005 | Popescu-Stanesti | H02J 1/08 320/138 |
| 2007/0262651 | A1* | 11/2007 | Odaohara | G06F 1/30 307/66 |
| 2008/0100143 | A1* | 5/2008 | Lipcsei | H02J 7/0068 307/80 |
| 2009/0027013 | A1* | 1/2009 | Odaohhara | H02J 7/0068 320/160 |

(Continued)

FOREIGN PATENT DOCUMENTS

CN 101441509 A 5/2009
CN 100495876 C 6/2009
(Continued)

*Primary Examiner* — Alexis B Pacheco
(74) *Attorney, Agent, or Firm* — CKC & Partners Co., LLC (57) ABSTRACT

The power supply module includes a switching power circuit, a switching unit, a power storage unit and a control unit. The switching power circuit is coupled between an input terminal and an output terminal, and used to convert a first voltage to a second voltage. The switching unit is connected to the switching power circuit in parallel. The power storage unit is coupled to the output terminal. The control unit is coupled to the switching unit and controls the switching unit to turn on selectively according to a detecting signal corresponding to a charging or discharging status of the power storage unit to output the first voltage to the output terminal.

6 Claims, 5 Drawing Sheets

(56) References Cited

U.S. PATENT DOCUMENTS

| | | | |
|---|---|---|---|
| 2009/0167245 A1* | 7/2009 | Nguyen | H02J 7/0052 320/128 |
| 2010/0162010 A1* | 6/2010 | Su | H02M 1/34 713/300 |
| 2010/0277294 A1* | 11/2010 | Tajima | G06F 1/266 340/538 |
| 2012/0019207 A1* | 1/2012 | Kuo | H01R 25/003 320/111 |
| 2012/0074894 A1* | 3/2012 | Chen | B60L 11/005 320/103 |
| 2014/0032953 A1* | 1/2014 | Wei | G06F 1/3234 713/323 |
| 2014/0203763 A1* | 7/2014 | Zhao | H02J 7/0081 320/107 |

FOREIGN PATENT DOCUMENTS

| | | |
|---|---|---|
| TW | 201145756 A | 12/2011 |
| TW | 201205994 A | 2/2012 |

\* cited by examiner

POWER SUPPLY MODULE AND POWER SUPPLY METHOD USING THE SAME

CROSS-REFERENCE TO RELATED APPLICATION

This application claims the priority benefit of Taiwan application serial No. 104123418, filed on Jul. 20, 2015. The entirety of the above-mentioned patent application is hereby incorporated by reference herein and made a part of specification.

BACKGROUND OF THE INVENTION

Field of the Invention

The disclosure relates to a power supply module, particularly, to a power supply module of a battery.

Description of the Related Art

With the popularization of kinds of portable electronic devices such as smart phones, tablet computers and slim notebooks, the power duration nine of the electronic devices is important. However, in the conventional charging architecture, repeated electrical energy conversion process may generate high power loss to cause the conversion efficiency of the power supply system lower.

BRIEF SUMMARY OF THE INVENTION

According to a first aspect, a power supply module comprise a switching power circuit, coupled between an input terminal and an output terminal, configured to convert a first voltage to a second voltage; a switching unit, connected to the switching power circuit in parallel; a power storage unit, coupled to the output terminal; and a control unit, coupled to the switching unit, configured to control the switching unit to turn on selectively according to a detecting signal corresponding to a charging or discharging status of the power storage unit to output the first voltage to the output terminal.

According to a second aspect, a power supply method applied to a power supply module, wherein the power supply module includes a switching power circuit, a switching unit and a power storage unit, comprise detecting a charging status of the power storage unit and selectively outputting a detecting signal; controlling the switching unit to turn on selectively according to the detecting signal; converting a first voltage to a second voltage via the switching power circuit when the switching unit is turned off; and outputting the first voltage to a output terminal of the power supply module via the switching unit when the switching unit is turned on.

From the above, the disclosure selectively turn on the switching unit by detecting the charging or discharging status of the power storage unit, and the charging architecture can be adjusted to reduce unnecessary power conversion loss and enhance the conversion efficiency of overall power supply system when the load of the system is heavy or the power storage unit is fully charged. Furthermore, when the charging power supply has a current control function, greater current is output bypass the switching power supply circuit while charging the power storage unit and providing power to the load, which is not limited by the flow limit of the inductance in the switching power supply circuit and makes the power supply more efficient and more resilient.

DETAILED DESCRIPTION OF THE EMBODIMENTS

These and other features, aspects, and advantages of the present disclosure will become better understood with regard to the following description, appended claims, and accompanying drawings. Persons having ordinary skill in the art may make various modifications and changes without departing from the scope and spirit of the disclosure, When an element is described "connected" or "coupled", it means "electrically connected" or "electrically coupled". "Connected" or "coupled" also indicates interaction or other operation between two or among more elements. "The first", "the second" and so on are used to describe difference elements in the context, which are not used to limit the order or sequence, except clearly illustrated in the context.

Figure 1:
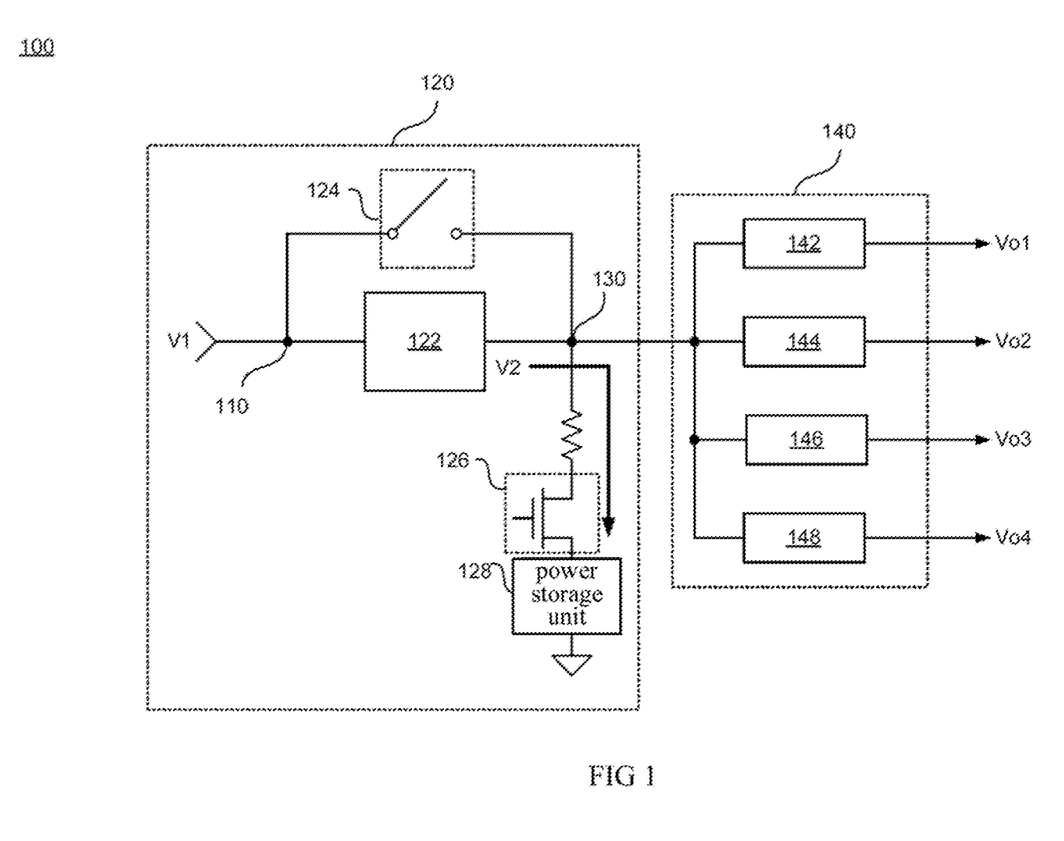
FIG. 1 is a schematic diagram showing a charging system in an embodiment.

Refer to FIG. 1. FIG. 1 is a schematic diagram showing a charging system 100 in an embodiment. The charging system 100 includes a power supply module 120 and a load 140. The power supply module 120 includes a switching power circuit 122, a switching unit 124, a protective switch 126 and a power storage unit 128. The load 140 is coupled to an output terminal 130 of the power supply module 120, and the output voltage of the output terminal 130 is converted to required voltages Vo1, Vo2, Vo3 and Vo4 through different conversion units 142, 144, 146 and 148.

The switching power circuit 422 is connected to the switching unit 124 in parallel, and two ends of the switching power circuit 122 is coupled to an input terminal 110 and the output terminal 130 of the power supply module 120, respectively. The protective switch 126 is coupled between the power storage unit 128 and the output terminal 130. The input terminal 110 receives a first voltage from a charging power supply (not shown). The output terminal 130 outputs output voltage to every conversion unit 142, 144, 146 and 148 in the load 140.

As shown in FIG. 1, when the power supply module 120 charges the power storage unit 128, the switching unit 124 is turned off, the switching power circuit 122 receives a first voltage V1 from the input terminal 110, and the first voltage V1 is converted to a second voltage V2 to output to the output terminal 130. In an embodiment, the charging power supply is a power adapter, the switching power circuit 122 is a buck converter converting the first voltage V1 of about 5V provided by the power adapter to the second voltage V2 of about 3-4.2V. In this condition, the protective switch 126 is turned on, which makes the power storage unit 128 store power according to the second voltage V2 output from the output terminal 130.

Meanwhile, the conversion units 142, 144, 146 and 148 in the load 140 receives the second voltage V2 of about 3-4.2V, respectively, and further converts the second voltage V2 to voltage Vo1, Vo2, Vo3 and Vo4 required by different element or device. In an embodiment, voltage Vo1 is provided for a backlight unit, voltage Vo2 is a system voltage of 5V, voltage Vo3 is a system voltage of 3V, voltage Vo4 is provided for a CPU (Central Processing Unit), in other embodiments, the number and type of the conversion units 142-148 and the range of Vo1-Vo4 can be adjusted according to actual requirements, in an embodiment, the second voltage V2 also can be converted to 1.35V, 1.1V or 1.8V by the conversion units 142-148. Therefore, the values cited above are only embodiments, which are not limited herein.

In detail, the switching unit 124 and the protective switch 126 may be a MOSFET (Metal-Oxide-Semiconductor Field-Effect Transistor), a BJT (Bipolar Junction Transistor) or other proper semiconductor elements. The conversion units 142-148 may be different kinds of convertors, such as a boost converter, a buck converter or a buck-boost converter.

In an embodiment, when the load 140 is heavy or the power storage unit 128 is completely charged, most power is provided to the load 140 directly, while the power provided to the power storage unit 128 is decreased. After two stage of conversion by the switching power circuit 122 and the conversion units 142-148, unnecessary power loss is generated, and the whole power efficiency is reduced.

In an embodiment, if conversion efficiency of the switching power circuit 122 is 90% and conversion efficiency of the conversion unit 142 is 90%. When the first voltage V1 provided by the power adapter is convened to the second voltage V2 via the switching power circuit 122, and then converted to Vo1 via the conversion unit 142, the whole conversion efficiency is only 81%, which greatly affects the power consumption of the system. Otherwise, under some condition, when power is supplied to a USB (Universal Serial Bus), a backlight, an audio module, the voltages Vo1-Vo4 needed by the load 140 are often higher than the second voltage V2, which makes the voltage reduced via the buck converter and then boosted via the boost converter, and unnecessary power loss is generated.

In order to reduce the extra power loss caused by that the first voltage V1 needs to be reduced to the second voltage V2 via the power supply module 120, then boosted or reduced to Vo1-Vo4, the power supply module 120 can selectively stop charging the power storage unit 128 according to the charging or discharging status of the power storage unit 128 to increase the conversion efficiency of the whole system.

Thus, when the first voltage V1 is not provided to the charging system 100 via the input terminal 110, the power storage unit 128 provides the second voltage V2 to the load 140, and the second voltage V2 is boosted or reduced to Vo1-Vo4 required by different elements or devices via the load 140.

Figure 2:
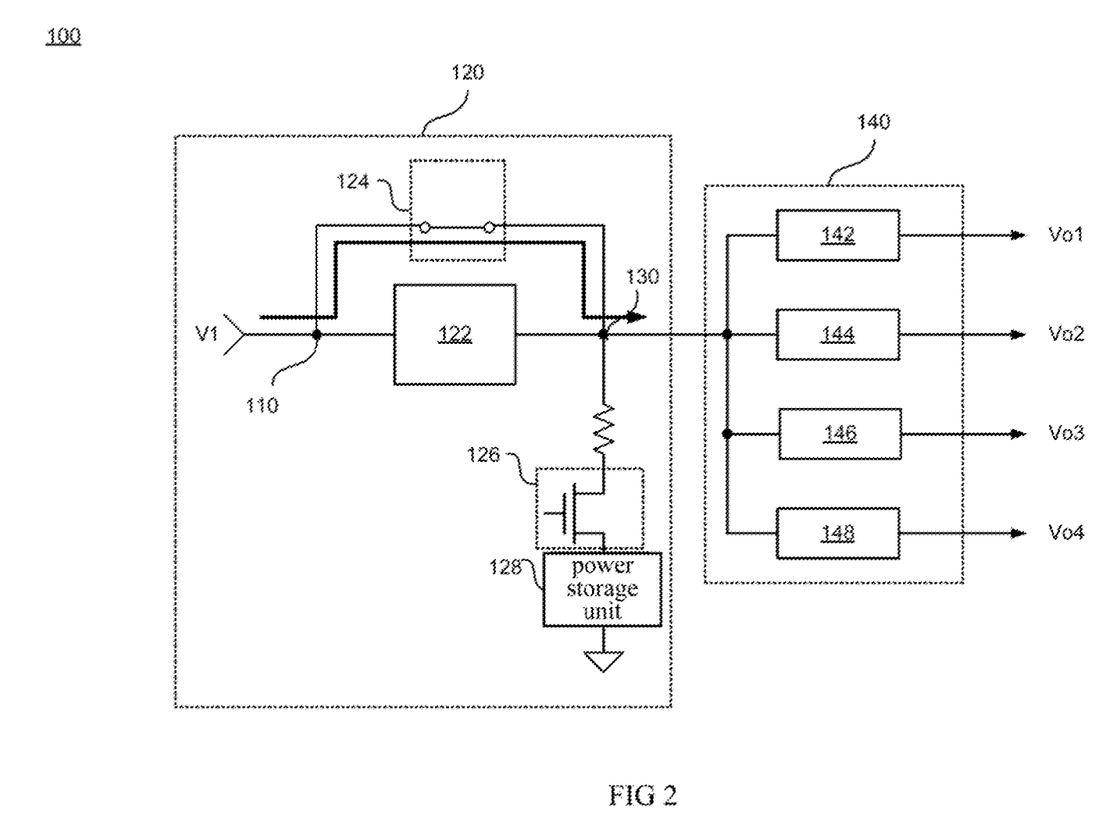
FIG. 2 is a schematic diagram showing a charging system in an embodiment.

Refer to FIG. 2, FIG. 2 is a schematic diagram showing a charging system 100 in an embodiment. As shown in FIG. 2, the power supply module 120 controls the protective switch 126 to turn off according to the charging or discharging status of the power storage unit 128 to make the power supply module 120 stop charging the power storage unit 128. Then the switching unit 124 is turned on to form a short circuit between the input terminal 110 and the output terminal 130. After above operation, the first voltage V1 bypasses the switching power circuit 122 and outputs to the load 140 directly via the output terminal 130. Therefore, the conversion units 142-148 in the load 140 can convert the first voltage V1 to the required voltage Vo1~Vo4 directly, which increases the conversion efficiency of the whole system.

Figure 3:
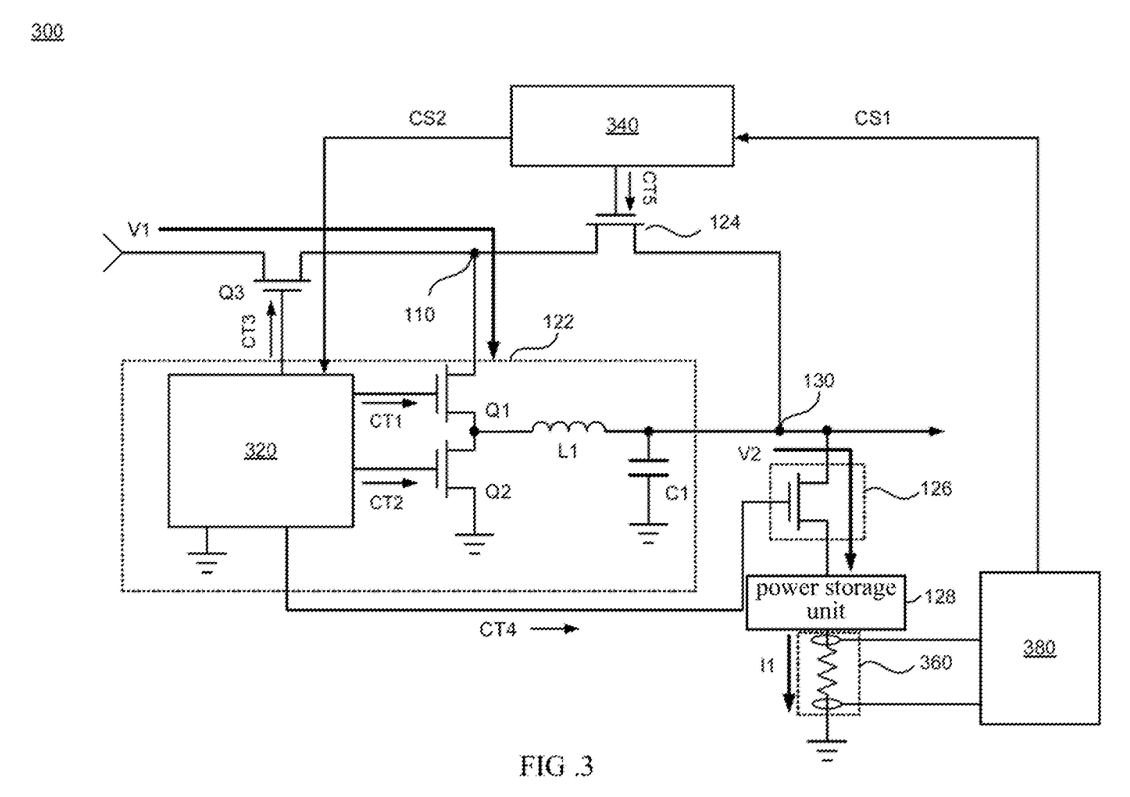
FIG. 3 is a schematic diagram showing an power supply module in an embodiment.
Figure 4:
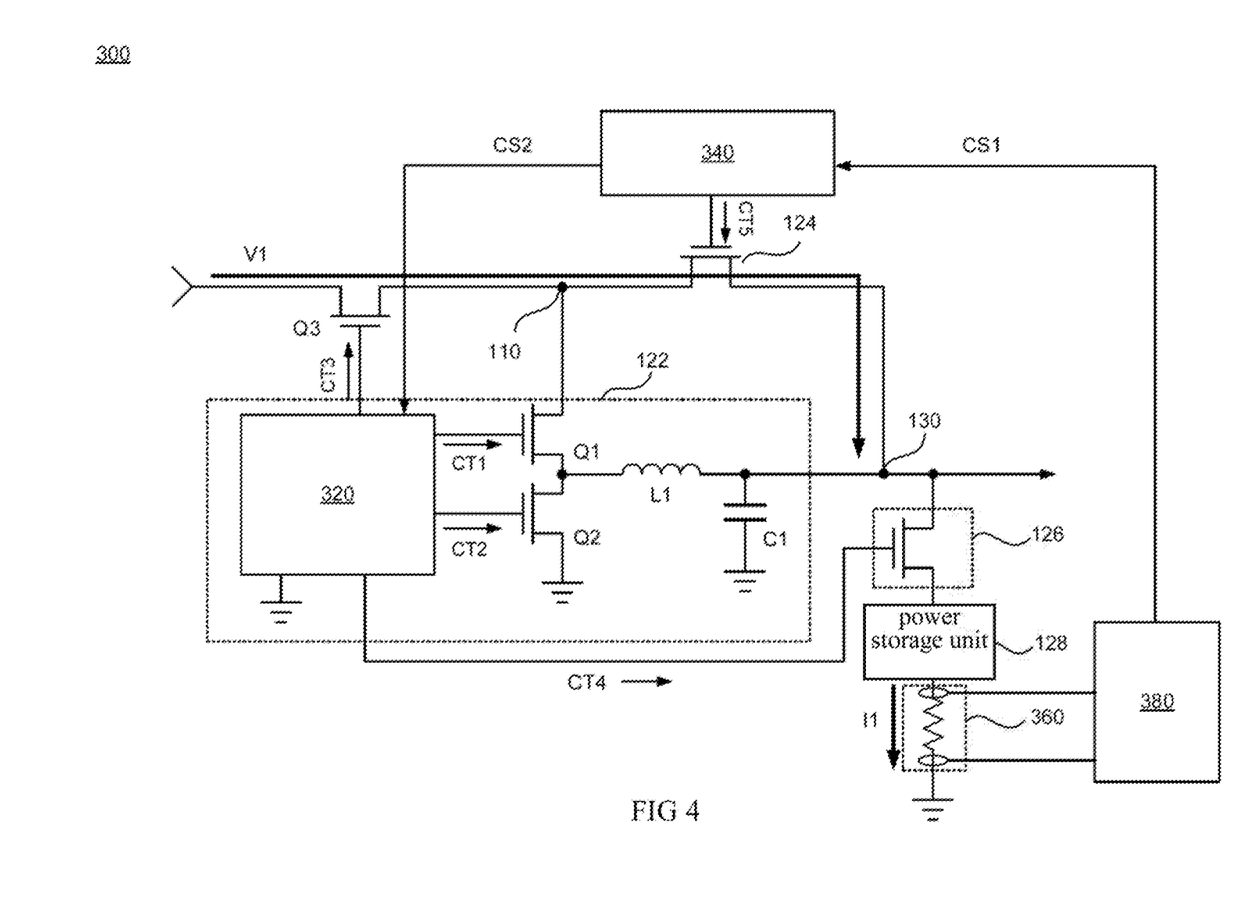
FIG. 4 is a schematic diagram showing an power supply module in an embodiment.

Specific operate method and control method of the power supply module 120 are described alone with the embodiment in FIG. 3 and FIG. 4. Refer to FIG. 3 and FIG. 4. FIG. 3 and FIG. 4 is a schematic diagram showing the power supply module 300 in an embodiment, respectively. The power supply module 300 includes the switching power circuit 122, the switching unit 124, the protective switch 126, the power storage unit 128, a control unit 340, a sensing element 360 and a detection unit 380.

FIG. 3 and FIG. 1 show similar embodiments, when a third switch Q3 is turned on, the switching power circuit 122 receives the first voltage V1 (such as about 5V) from the input terminal 110, converts the first voltage V1 is to the second voltage V2 (such as: about 3-4.2V), and outputs the second voltage V2 to the output terminal 130.

In the embodiment, the switching power circuit 122 is a buck converter, and the first voltage V1 is higher than the second voltage V2. The switching power circuit 122 includes a charging control unit 320, a first switch Q1, a second switch Q2, an inductance L1, a capacitance C1. The charging control unit 320 generates a first pulse signal CT1 and a second pulse signal CT2 to control the first switch Q1 and the second switch Q2, respectively. Otherwise, the charging control unit 320 outputs a control signal CT3 to control the third switch Q3 to turn on/turn off to control whether to receive the first voltage V1 from the charging power supply.

A first end of the first switch Q1 is coupled to the input terminal 110, a second end of the first switch Q1 is coupled to the voltage node 150, and a control end receives the first pulse signal CT1 to turn on the first switch Q1 selectively according the first pulse signal CT1. The first end of the second switch Q2 is coupled to the voltage node 150, the second end of the second switch Q2 is coupled to the ground end, the control end receives the second pulse signal CT2 to turn on the second switch Q2 selectively according the second pulse signal CT2. The inductance L1 is coupled between the voltage node 150 and the output terminal 130. The capacitance C1 is coupled between the output terminal 130 and the ground end. By the above-described structure, the charging control unit 320 controls the switching power circuit 122 to output the second voltage V2 according to the first pulse signal CT1 and the second pulse signal CT2. Thus, when the protective switch 126 is turned on, the power storage unit 128 stores power according to the second voltage V2.

In the embodiment, the sensing element 360 is coupled to the power storage unit 128 to sense the charging or discharging status of the power storage unit 128. The detection unit 380 is coupled to the sensing element 360 and the control unit 340 to output a detecting signal CS1 to the control unit 340 according to the charging or discharging status. Thus, the control unit 340 outputs the control signal CT5 to control the switching unit 124 according to the detecting signal CS1 corresponded to the charging or discharging status of the power storage unit 128.

In the embodiment, the control unit 340 further outputs the detecting signal CS2 to the charging control unit 320 according to the detecting signal CS1 to make the charging control unit 320 respectively output the first pulse signal CT1, the second pulse signal C12 and the control signal CT3, C14 according to the detecting signal CS2. Thus, the charging control unit 320 controls the first switches Q1, Q2, Q3 and the protective switch 126 to turn on/off according to the charging or discharging status of the power storage unit 128.

In the embodiment, the charging control unit 320 can receive the detecting signal CS1 from the detection unit 380 directly to get the charging or discharging status of the power storage unit 128, and then control the first switches Q1, Q2, Q3 and the protective switch 126 to turn on or turn off. The detection unit 380, the control unit 340 and the charging control unit 320 can be integrated based on actual requirement in practical applications and the circuit shown in FIG. 3 is only an embodiment, which is not limited herein.

As shown in FIG. 3, the sensing element 360 may be a resistance element (such as a resistance), the detection unit 380 detects a storage current I1 flowing through the sensing element 360 to get the changing or discharging status of the power storage unit 128. When the storage current I1 is higher than or equals to a preset value, it indicates the power storage unit 128 is storing power Then, the control unit 340 outputs the control signal CT5 accordingly to control the switching unit 124 to turn off, the charging control unit 320 outputs the control signal CT4 accordingly to control the protective switch 126 to turn on, and outputs the first pulse signal CT1, the second pulse signal CT2 to control the switching power circuit 122 to convert the first voltage V1 to the second voltage V2, and the power storage unit 128 stores power.

In the embodiment, when the storage current I1 is less than the preset value, it indicates the power storage unit 128 almost completes storing power. In this condition, as shown in FIG. 4, the detection unit 380 outputs the detecting signal CS1. The control unit 340 outputs the detecting signal CS2 accordingly to the charging control unit 320, when receiving the detecting signal CS1. The charging control unit 320 outputs the control signal CT4 according to the detecting signal CS2 to control the protective switch 126 to turn on or turn off, or make the protective switch 126 operate at linear operating range with high impedance values to shut off the current path between the power storage unit 128 and the output terminal 130, which makes the power supply module 300 stop charging the power storage unit 128.

The control unit 340 outputs the control signal CT5 to turn on the switching unit 124, which forms a short circuit between the input terminal 110 and the output terminal 130, and the first voltage V1 is output to the output terminal 130. The charging control unit 320 outputs the corresponding first pulse signal CT1, the second pulse signal CT2 to control the switching power circuit 122 stop operating. In an embodiment, the charging control unit 320 outputs the pulse signal CT1, CT2 to make the first switch Q1 turn on, while the second switch Q2 is turned off. Thus, the switching power circuit 122 does not generate extra switching loss caused by repeated switching of the first switch Q1 and the second switch Q2 between turn on and turn off status. In other words, through controlling the first switch Q1, the second switch Q2 stops the pulse width modulation operation; the power supply module 300 can further reduce the loss. Therefore, the power supply module 300 can output the first voltage V1 received from the charging power supply (such as the power adapter) to the output terminal 130 directly and used by the load 140.

In an embodiment, when the storage current I1 is less than the preset value, it indicates that most of the power is directly provided to the load 140 since the load 140 is heavy and the proportion of the charging current to the power storage unit 128 is reduced, in this condition, similar to the former embodiment, the charging control unit 320 outputs the control signal CT4 according to the detecting signal CS2 to control the protective switch 126 to rum on or turn off, or makes the protective switch 126 operate at linear operating range with high impedance to make the power supply module 300 stop charging the power storage unit 128.

The control unit 340 outputs the control signal CT5 to control the switching unit 124 to turn on, and makes the first voltage V1 output to the output terminal 130. Thus, the power supply module 300 can output the first voltage V1 received from the charging power supply (such as the power adapter) to the output terminal 130 directly and used by the load 140. Unnecessary power loss is reduced since the power does not go through a two stage of conversion by the switching power circuit 122 and the conversion units 142-148, and the whole power efficiency is increased. Since the protective switch 126 is turned off or is operated at linear operating range with high impedance, the higher volt of the first voltage V1 does not damage the power storage unit 128.

Otherwise, in an embodiment, the Charging power supply (such as: the power adapter) has a current control function itself. The Charging power supply can control the value of the first voltage V1, thus the voltage buck regulation though the switching power circuit 122 is not necessary. The switching unit 124 and the protective switch 126 are turned on simultaneously, which makes the charging power supply can provide power to the load 140 and simultaneously charge the power storage unit 128. When the switching unit 124 is turned on, the current is output to the output terminal 130, the power storage unit 128 and the load 140 directly through the switching unit 124 from the input terminal 110 without flowing through the inductance L1 of the switching power circuit 122. Thus the current provided by the charging power supply can exceed the maximum current that inductance L1 can withstand without damaging the system. Thus, the charging power supply can provide power to the load 140 and simultaneously charge the power storage unit 128 more efficiently.

Figure 5:
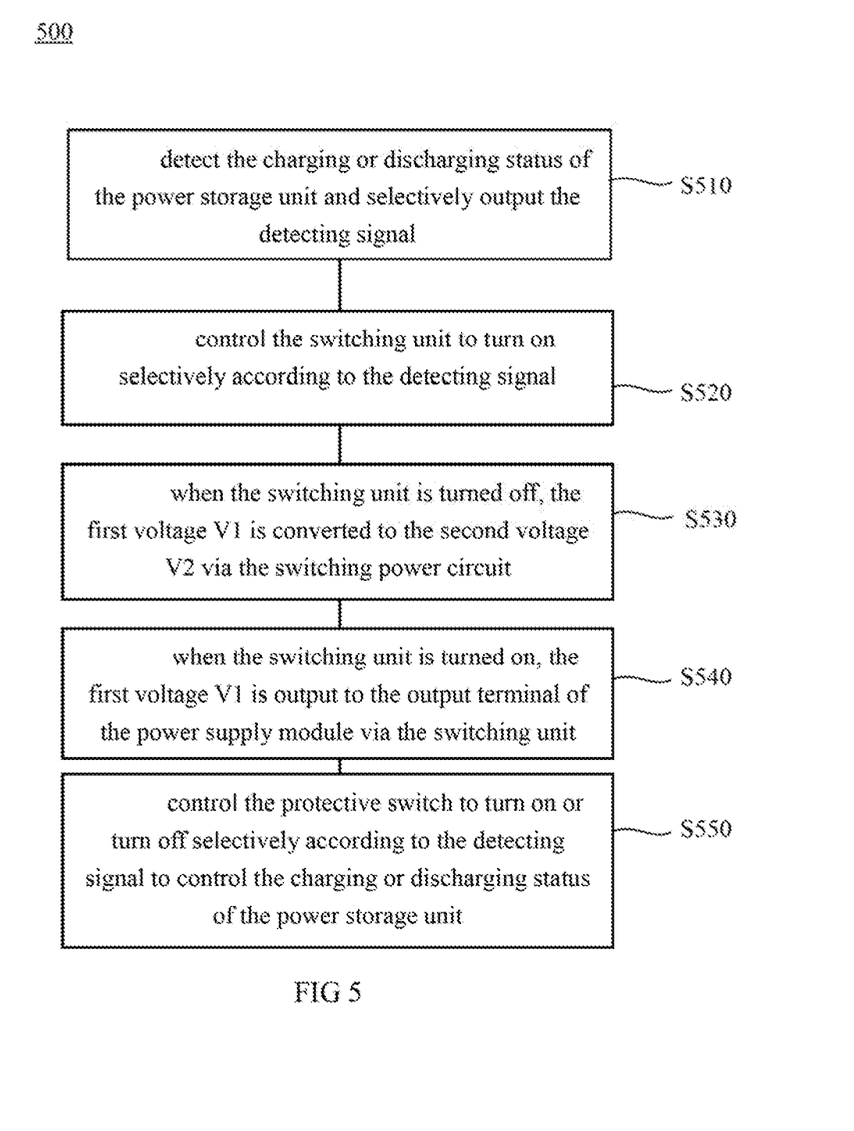
FIG. 5 is a flow diagram showing an power supply method in an embodiment.

FIG. 5 is a flow diagram showing a power supply method 500 in an embodiment. The power supply method 500 can be applied to the power supply module 300 shown in FIG. 3 and FIG. 4. For illustrative purposes, the following paragraphs will be described with the embodiment in FIG. 3 and FIG. 4. As shown in FIG. 5, the power supply method 500 includes steps S510, S520, S530 and S540. In step S510, the detection unit 380 detects the charging or discharging status of the power storage unit 128 according to the sensing. element 360, and selectively output the detecting signal CS1. In step S520, the control unit 340 outputs the control signal CT5 according to the detecting signal CS1 to control the switching unit 124 to turn on selectively. In step S530, when the switching unit 124 is turned off, the power supply module 300 converts the first voltage V1 to the second voltage V2 via the switching power circuit 122 to make the power storage unit 128 store power according to the second voltage V2. In step 8540, When the switching unit 124 is turned on, the power supply module 300 outputs the first voltage V1 to the output terminal 130 of the power supply module 300 via the switching unit 124. In detail, the detection unit 380 detects the storage current I1 of the sensing element 360 and outputs the detecting signal CS1 when the storage current I1 is lower than the preset value, which makes the control unit 340 output the control signal CT5 to control the switching unit 124 to turn on/off.

In an embodiment, the power supply method 500 further includes step S550. In step S550, the charging control unit 320 controls the protective switch 126 to turn on/off selectively according to the detecting signal CS2 to control the charge/discharge of the power storage unit 128. In detail, when the charging power supply itself has current control function, the control unit 340 turns on the switching unit 124 and the charging control unit 320 turns on the protective switch 126 to make the power supply module 300 charge the power storage unit 128 according to the first voltage V1, and simultaneously provide power to the output terminal 130 of the power supply module 300.

The above content includes exemplary step. However, these steps are not necessary executed sequentially. And the sequence of the steps referred in, the present embodiment can be adjusted according to actual requirement or even simultaneously or partially simultaneously executed, unless the sequence has been particularly noted.

In above embodiments, every element (such as the charging control unit 320, control unit 340) in the power supply module 300 can be achieved by kinds of digital or analog circuits, also can he achieved by different integrated circuit chips or a single integrated digital control chip. The foregoing is merely an embodiment and is not limited herein. In practice, specific implementation of each element in the power supply module 300 can be selected according to the actual requirement.

Although the present disclosure has been described in considerable detail with reference to certain preferred embodiments thereof, the disclosure is not for limiting the scope. Persons having ordinary skill in the art may make various modifications and changes without departing from the scope. Therefore, the scope of the appended claims should not be limited to the description of the preferred embodiments described above.

What is claimed is:

1. A power supply module, comprising:
    a switching power circuit, coupled between an input terminal and an output terminal, configured to convert a first voltage to a second voltage;
    a switching unit, connected to the switching power circuit in parallel;
    a power storage unit, coupled to the output terminal; and
    a control unit, coupled to the switching unit, configured to control the switching unit to turn on selectively according to a detecting signal corresponding to a charging or discharging status of the power storage unit to output the first voltage to the output terminal, and configured to switch the switching unit to turn on to output the first voltage to the output terminal when it is detected that the power storage unit is in the discharging status.

2. The power supply module according to claim 1, further includes a protective switch coupled between the power storage unit and the output terminal, the protective switch configured to selectively turned on or turned off according to the detecting signal to control the power storage unit to be charged or discharged.

3. The power supply module according to claim 1, further includes:
    a sensing element, coupled to the power storage unit, configured to sense the charging or discharging status of the power storage unit; and
    a detection unit, coupled to the sensing element and the control unit, configured to output the detecting signal to the control unit according to the charging or discharging status.

4. The power supply module according to claim 1, wherein the switching power circuit includes:
    a first switch;
    a second switch, coupled to the first switch;
    a charging control unit, coupled to the first switch and the second switch, configured to generate a first pulse signal and a second pulse signal to selectively control the first switch and the second switch to turn on or turn off;
    an inductance, coupled to the first switch and the second switch; and
    a capacitance, coupled to the inductance.

5. The power supply module according to claim 4, wherein the charging control unit is further configured to selectively control the first switch and the second switch to turn on or turn off according to the detecting signal.

6. The power supply module according to claim 3, wherein the detection unit is further configured to determine the load status of the power supply module according to the charging or discharging status of the power storage unit, when the load status is heavy, the control unit controls the first switch to turn on and the second switch to turn off.

* * * * *